United States Patent [19]

Showalter

[11] 4,105,253
[45] Aug. 8, 1978

[54] PROCESS FOR RECOVERY OF MINERAL VALUES FROM UNDERGROUND FORMATIONS

[75] Inventor: William E. Showalter, Seal Beach, Calif.

[73] Assignee: Union Oil Company of California, Brea, Calif.

[21] Appl. No.: 767,788

[22] Filed: Feb. 11, 1977

[51] Int. Cl.² .................................... E21B 43/28
[52] U.S. Cl. ................................ 299/4; 299/5; 423/15; 423/17; 423/18
[58] Field of Search .......... 299/5, 4; 166/312; 423/15, 17, 18, 20

[56] References Cited

U.S. PATENT DOCUMENTS

| 2,154,468 | 4/1939 | Oplinger | 252/100 |
| 2,896,930 | 7/1959 | Menke | 299/5 |
| 2,964,109 | 12/1960 | Martin | 166/312 X |
| 3,130,960 | 4/1964 | Martin | 299/5 |
| 3,860,289 | 1/1975 | Learmont | 299/5 |

*Primary Examiner*—Ernest R. Purser
*Assistant Examiner*—William F. Pate, III
*Attorney, Agent, or Firm*—Richard C. Hartman; Dean Sandford; Daniel R. Farrell

[57] ABSTRACT

Carbon dioxide is admixed with water to form a carbonic acid solution for use as a leaching solution for extraction of uranium by solution mining. An oxidizing agent is also present in the solution.

25 Claims, 1 Drawing Figure

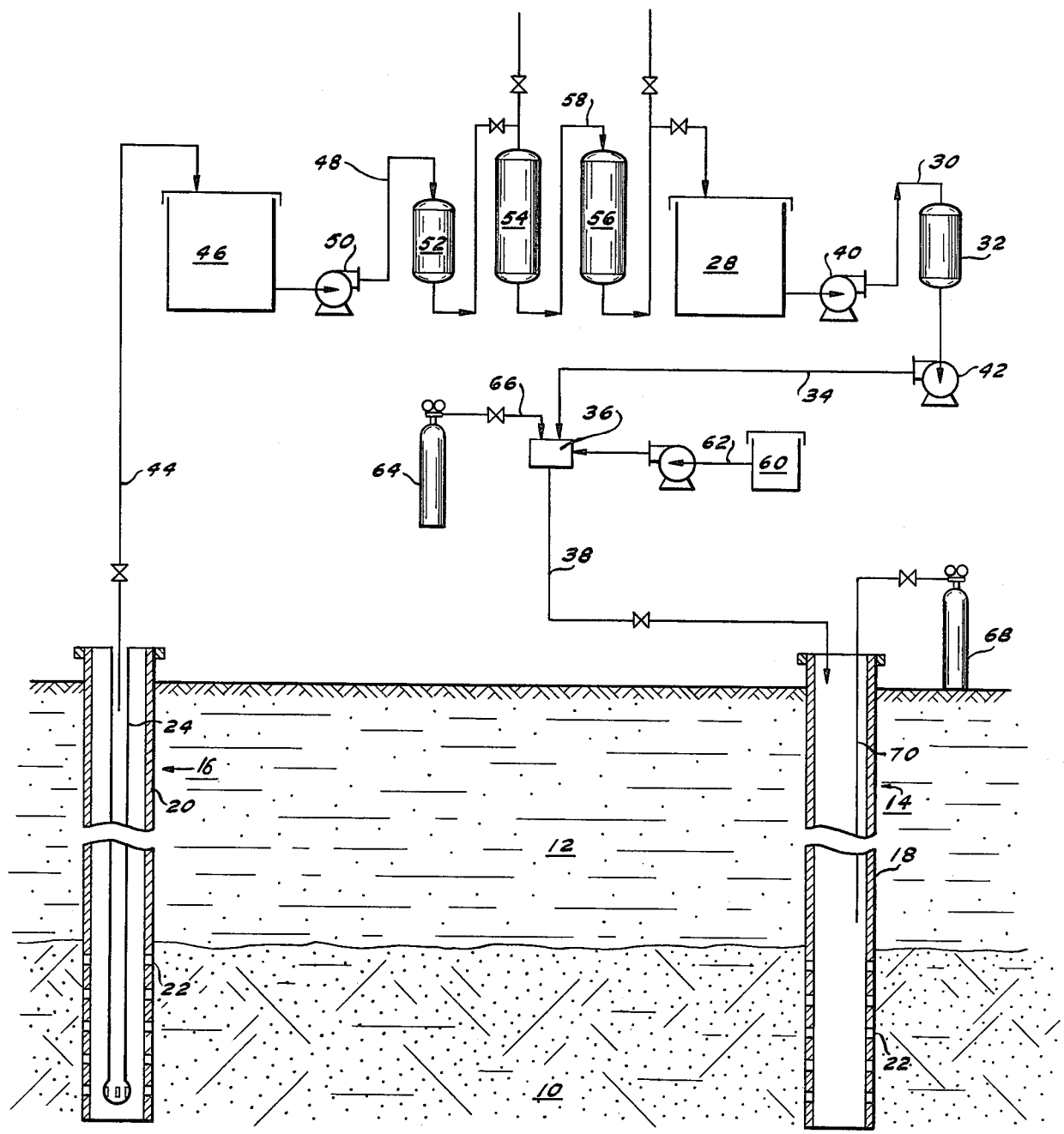

PROCESS FOR RECOVERY OF MINERAL VALUES FROM UNDERGROUND FORMATIONS

BACKGROUND OF THE INVENTION

This invention relates to the recovery of mineral values from subterranean formations and more particularly to a process for leaching subterranean mineral deposits to recover the mineral values.

The in situ leaching of mineral values from subterranean deposits is well-known in the art as a practical and economical means for recovering certain elements such as uranium, copper, nickel, molybdenum, rhenium, vanadium and the like. Basically, solution mining is carried out by injecting into the subterranean deposit, a leaching solution which will solubilize the mineral value desired to be recovered and the solution and solubilized mineral values are recovered from the deposit for subsequent separation of the mineral values. Often it is necessary to oxidize the mineral value to a form where it can form a soluble reaction product in the leaching solution. Depending upon the nature of the subterranean deposit, the typical leaching solution may be an acid, for example, an aqueous sulfuric acid solution or may comprise an alkaline carbonate solution. In view of the high proportion of carbonates typically present in many subterranean formations, the use of acid solution is usually prohibitive because of the excessive consumption of acid due to carbonate solubilization. Consequently, alkaline carbonate leaching solutions are preferred to acid solutions for solution mining operations when carbonates are present in the formation.

Various solution mining processes involving the use of alkaline carbonate leaching solutions are disclosed in the prior art, for example in U.S. Pat. No. 3,708,206, using an aqueous ammonium carbonate solution and an oxidizing agent and U.S. Pat. No. 2,896,930, utilizing an aqueous solution of an alkali metal carbonate and hydrogen peroxide. Typically, the alkaline carbonate leaching solutions are maintained at a pH of about 8.2 to about 8.3. However, alkaline carbonate leaching solutions can present problems with respect to reduction of injectivity of the leaching solution and consequentially reduced mineral production. Reduced injectivity can generally be ascribed to two major factors. The first factor is the swelling of formation clays by the alkaline solution. A second major factor is the exchange of cations, such as sodium, from the leaching solution with the calcium ions of the formation which results in the production of calcium carbonate in the leaching solution. Calcium carbonate, at the alkaline pHs utilized, precipitates from the leaching solution thus reducing the permeability of the formation, well injectivity, and causes scaling problems in the pumps and other ancillary equipment utilized in the process.

The present invention overcomes the foregoing deficiencies by providing a process for the recovery of mineral values from subterranean formations in which the loss of permeability and production associated with the alkaline leaching solutions is avoided.

SUMMARY OF THE INVENTION

The present invention relates to the extraction and recovery of substances from subterranean deposits by contacting the subterranean deposit with a non-alkaline carbonated leaching solution for the in situ solubilization of the substance to be recovered, extracting the solution from the formation and separating the substance to be recovered from the solution. More particularly the leaching solution comprises carbonic acid and an oxidizing agent for the substance to be recovered. Preferably the leaching solution is formed by the dissolution of gaseous carbon dioxide and an oxidizing agent in water.

The present invention avoids many of the problems associated with solution mining processes using alkaline carbonate leaching solutions; particularly the reduction of formation permeability. Other advantages and features of the present invention will become apparent from the following detailed description and from the drawing appended hereto.

BRIEF DESCRIPTION OF THE DRAWING

The drawing is a schematic diagram of a solution mining operation in which the present invention is practiced.

DETAILED DESCRIPTION OF THE INVENTION

In the following description and examples the invention will be described in connection with the recovery of uranium values by the solubilization thereof from uranium bearing ores. However, it should be clear that the invention is applicable to the solution mining of other mineral values capable of forming soluble reaction products with carbonated leaching solutions. Thus, for example, substances such as vanadium, molybdenum, nickel, copper, the rare earths and the like are recovered using the process of the present invention.

Uranium minerals frequently occur in the highly siliceous rocks and sedimentary deposits, generally as a mixture of the insoluble quadrivalent form and the soluble sexivalent form. Uranium is also found in association with the silicates, phosphates and zirconates of the rare earths and with columbium, tantalum and thorium. Pitchblende, an amorphous compound of uranium, frequently occurs with sulfite minerals and other uranium minerals such as uraninite containing, for example, 40 to 90% $U_3O_8$ (i.e. $UO_2 \cdot 2UO_3$). In addition uranium is often associated with other metals such as calcium, thorium, iron, bismuth, copper and zinc in various mineral forms, thus, for example, common uranium minerals include carnotite, $K_2(UO_2)_2(VO_4)_2 \cdot 3H_2O$; coffinite, $U(SiO_4)_{1-x}(OH)_{4x}$; Schroeckingerite, $NaCa_3(UO_2)(CO_3)_3 \cdot (SO_4)F \cdot 10H_2O$; and uraninite, $(U^{+4}_{1-x}, U_x^{+6})O_{2+x}$, ideally $UO_2$.

In solution mining processes, an oxidizing agent is utilized to contact the mineral deposit to oxidize the uranium to its soluble sexivalent form. The deposit then is contacted with a leaching solution to solubilize the sexivalent uranium, which is extracted with the solution. The oxidation of the uranium can be carried out as a separate step or simultaneously with the leaching step by dissolving the oxidizing agent in the leaching solution. As mentioned above, conventional alkaline carbonate solutions, for example ammonium carbonate or sodium carbonate and/or bicarbonate solutions, lead to swelling of the formation clay, and ion exchange with calcium ions, both of which situations can lead to plugging, scaling, injectivity and production loss.

Conventionally, the leaching solution is brought into contact with the subterranean deposit by injection into one or more injection wells which penetrate the deposit. The leaching solution is introduced into the injection well under sufficient pressure to force it out of the well bore into the adjacent deposit. Continued injection of leaching solution drives the solution through the deposit to one or more spaced-apart production wells where the solution is recovered for subsequent extraction of the mineral values. The number of injection and production wells and the spacing therebetween can very depending upon the nature of the formation. Additionally, the pattern of injection and production wells can also vary although a typical pattern is the five-spot pattern consisting of a centrally disposed recovery well and four injection wells spaced around the recovery well. Alternatively, a given volume of leaching solution can be injected into a well to percolate into the surrounding formation. Following the injection phase, the well is pumped out and the injected leaching solution is recovered from the same well into which it had been injected.

Referring to the drawing, a mineral bearing formation 10 underlies an overburden 12 and, for the purposes of illustration, the mineral formation is taken to be uranium oxide as uraninite in association with a mixture of inorganic materials such as limestone, sand or mixtures of these. One or more injection wells 14 and one or more production wells 16 extend through the overburden 12 and penetrate the mineral deposit 10. The injection well 14 and the production well 16 have casings 18 and 20 respectively which are sealed from the surrounding overburden 12 while the lower portions extending in the mineral deposit 10 are provided with perforations 22. A string of tubing 24 extends through the bore of the recovery well 16 and is provided with a downhole pump 26 for pumping fluids out of the recovery well. If desired, similar tubing can be provided in the injection well and with suitable valving and lines the process can be reversed so that the production well 16 becomes the injection well and the injection well 14 becomes the production well.

Leaching solution is held in a tank 28 which is in communication with the injection well 14 through a conduit 30, a sand filter 32, a conduit 34, a mixing tank 36 and a conduit 38. Filtering pressure is provided by a pump 40 in the line 30 and a pump 42 in the line 38 provides the injection pressure for the leaching solution.

A conduit 44 communicates with the tubing 24 and leads to a holding tank 46 for receiving the pregnant liquor pumped from the well 16. A conduit 48, provided with a pump 50, communicates between the pregnant liquor holding tank 46 and a sand filter 52 which is provided for filtering the pregnant liquor prior to its passage through ion exchangers 54 and 56, each of which contain a strong base ion exchange resin bed. A conduit 58 conducts liquid from the exchanger 56 into the leaching solution tank 28.

In accordance with the preferred procedure, leaching solution from the tank 28 is filtered in the filter 32 and oxidizing agent from a tank 60 is introduced through a conduit 62 into the mixing tank 36 for admixture with the leaching solution prior to its introduction into the injection well 14. The leaching solution may be introduced into the injection well by pumping, such as by pump 42, or by gravity, and the leaching solution enters the mineral deposit 10 through the perforations 22. While in contact with the mineral deposit 10, the leaching solution serves both to oxidize tetravalent uranium values and to solubilize the sexivalent values. The solution percolates through the mineral deposit 10 and reaches the production well 16 where it enters through the perforations 22. Pump 26 serves to pump the leaching solution through the tubing 24 and the conduit 44 to the pregnant liquor holding tank 46. From the tank 46 the solution is passed through the filter 52 and thence through the strong base anion exchange resin beds in ion exchangers 54 and 56 where the uranium values are separated from the solution and retained on the ion exchange resin. The solution, now barren of its uranium values, passes into the barren liquor holding tank 28 for recirculation into the formation as described above. The uranium values are subsequently eluted from the ion exchange resin beds by conventional means, for example elution with sodium chloride or the like. Also, piping and valving, not shown, preferably are provided for periodic backwashing and cleaning of the ion exchange resin beds in the ion exchangers 54 and 56.

In accordance with the invention, the process utilizes a leaching solution comprising an aqueous solution of carbonic acid, and it is preferred that the concentration of the carbonic acid be at least sufficient to maintain the solution pH at 7 and preferably below 7. The maximum carbonic acid concentration should not exceed the point where the amount of calcium carbonate formed will exceed the solubility in the leach solution thus causing scaling and precipitation problems. The maximum concentration will vary widely depending on the amount of calcium in the deposit, the type of water used to form the solution, the ratio of volume of solution injected to the volume of liquid produced and other factors well understood by those skilled in the art. A convenient measure of the carbonic acid concentration is as the amount of bicarbonate ion formed in the solution. In the case of uranium extraction from uraninite deposits, the carbonic acid concentration as bicarbonate ion can range between about 380 ppm to about 1000 ppm and preferably between about 460 ppm to about 700 ppm.

As mentioned, the quadrivalent uranium must be oxidized to its soluble sexivalent form for leaching. In this connection an oxidizing agent can be introduced prior to or simultaneously with the leaching solution as a separate solution or as a gas. Preferably, however, the process is operated continuously and the oxidizing agent and leaching solution are injected simultaneously. Preferred practice is to solubilize the oxidizing agent in the leaching solution. The preferred concentration of oxidizing agent, on a free oxygen basis, is between about 50 ppm and 200 ppm.

Any of the conventionally used oxidizing agents can be employed as the oxidant with the leaching solution in the present invention. For example, potassium permanganate, potassium ferricyanide, sodium hypochlorite, potassium peroxydisulfate, and hydrogen peroxide can be employed. In addition oxygen or oxygen-containing gases can be dissolved in water or the leaching solution to provide the necessary oxidizing agent. Hydrogen peroxide and oxygen are preferred oxidizing agents.

Referring to the drawing, a preferred way of preparing the leaching solution is shown where carbon dioxide gas is led from a pressurized container 64 through a conduit 66 to the mixing tank 36. In the mixing tank 36 the carbon dioxide gas is dissolved in the barren liquor and the oxidizing agent from the tank 60 thus forming the leaching solution for injection into the well 14.

In view of the pH of the leaching solution, there is a tendency for calcium salts, principally as carbonates, to be dissolved from the formation and to build up in the leaching solution. These dissolved salts can result in scaling and plugging problems when their concentration exceeds the solubility limits for the leaching solution. Consequently, it is highly preferred that fresh makeup water be added to dilute the calcium and salt content of the leaching solution. This is accomplished by introducing additional formation water to the system, either by the preferred method of producing more liquid than is injected or alternatively by adding water to the barren solution, such as in the tank 28. In either case some of the barren liquor is bled out of the system and disposed of so that the total volume of leaching solution does not exceed the capacity of the system.

In spite of precautions taken to reduce scaling, certain individual injection wells can have a tendency to form deposits along the well bore thus reducing the injectivity of that well. The injectivity of such problem wells is improved by the addition of carbon dioxide, such as from a pressurized container 68, directly into the well bore, such as through a conduit 70. In this manner the carbonic acid content of the leaching solution in the problem well is increased in the well bore and the pH of the solution is lowered. In effect this provides an acid treatment for the well and dissolves some or all of the deposited scale and results in an improvement of the injectivity in that well.

The point in the system at which the carbonic acid is solubilized in the leaching solution is not critical and a source of carbonic acid can be provided at each of the individual injection wells so that the carbonic acid content of the leaching solution is formed and adjusted in each of the individual well bores. Normally, however, it is preferred to introduce the carbonic acid at a central point such as in the mixing tank 36 as illustrated, except where an individual well requires additional carbonic acid to alleviate injectivity problems, as described above.

The invention is further described by the following examples which are illustrative of specific modes of practicing the invention and are not intended as limiting the scope of the invention defined by the appended claims.

EXAMPLE 1

This example illustrates the extraction by solution mining of uranium from a sedementary deposit of uranium bearing mineral in which the uranium is present in a mixture of various mineral forms including uraninite and coffinite. The uranium zone comprises a layer approximately 5 ft. to 200 ft. in thickness and is found below the surface a distance ranging from a few feet to 400 ft..

A pattern of wells were extended into the ore-bearing zone. The wells formed a 5-spot pattern comprising 4 injection wells spaced evenly about a central production well, with the injection wells defining a square having 50 foot sides. The static water level was found to be 50 ft. from the surface.

Initially, reservoir water was pumped into each of the injection wells at the rate of 6 gpm and it was found that the permeability of the formation would permit the injection of liquids at that rate. An aqueous ammonium bicarbonate solution (500 ppm) including hydrogen peroxide (50 ppm as free oxygen) was injected into each of the wells at the rate of 6 gpm. Within 24 hours from the initial injection, two of the injection wells had filled, indicating loss of injectivity, and it was necessary to increase the injection rate into the remaining two wells to about 10 gpm to maintain the desired total volume of injection. By the end of the second week of injections, injectivity of all four wells had fallen to the point where operations had to be discontinued. During this period the uranium concentration in the produced fluids from the production well reached a high of about 13 ppm.

The wells were pumped out drawing formation water in from the perimeter of the 5-spot pattern. After seven days of this treatment the injectivities were found to be restored and injection rates of 6–12 gpm were again possible.

An aqueous solution of hydrogen peroxide (50 ppm as free oxygen) was injected at the rate of 6 gpm into the four injection wells. Carbon dioxide gas was introduced into one of the injection wells while maintaining the introduction of the aqueous hydrogen peroxide solution. The carbon dioxide was introduced at the rate of about 2 lbs. per hr. and an immediate further improvement in injectivity of that well was noted. The carbon dioxide was then introduced into the formation water at the mixing tank along with a 50% hydrogen peroxide solution and the aqueous solution thus formed was then distributed to all four of the injection wells. The carbon dioxide was added at the rate of about 9 lbs. per hr. and the pH of the leaching solution at the injection well was between about 6.6 and 6.7. The pH of the solution leaving the production well was between about 6.7 and 6.8. The bicarbonate concentration in the leaching solution was permitted to build up to a level of between about 610 ppm and 690 ppm and the uranium concentration in the pregnant liquor thus produced was nominally 30 ppm at that bicarbonate level.

The pregnant liquor extracted from the production well was treated as shown in the drawing by filtration followed by contact with the strong base anion exchange resin to strip the uranium value from the solution. The barren liquor was then circulated through a mixing tank where the hydrogen peroxide, in the form of a 50% solution, and the carbon dioxide gas were added to form fresh leaching solution.

EXAMPLE 2

The effectiveness of the process of the carbonic acid leaching solution in the extraction of uranium values from ore deposits was demonstrated by the following laboratory tests. The ore samples utilized in the tests were obtained from the deposit of Example 1.

Samples of the ore were placed in containers along with a volume of leaching solution equivalent to two pore volumes of the ore sample. The oxidizing agent in all but one test was provided by bubbling oxygen through the leaching solution-ore mixture during the testing period. In one test, hydrogen peroxide was introduced with the leaching solution as the oxidizing agent. Contact between the ore and the leaching solution was maintained for 25 hours accompanied by stirring. Samples of the leaching solution were extracted every 5 hours and tested for their uranium content.

The leaching solutions being tested included an aqueous ammonium bicarbonate solution (1000 ppm) and a solution prepared by bubbling carbon dioxide gas through ordinary tap water at room temperature and atmospheric pressure. The tests and results are summarized in Table A following.

TABLE A

| Run # | Sample wt/gms | Sample Pore Vol/ml | Leaching Solution | Leaching Sol. vol/ml | Leaching Sol. pH | Oxidizer | Uranium in Solution, ppm | | | | |
|---|---|---|---|---|---|---|---|---|---|---|---|
| | | | | | | | 5 hr. | 10 hr. | 15 hr. | 20 hr. | 25 hr. |
| 1 | 357 | 105 | $NH_4HCO_3$ (1000 ppm) | 210 | 7.5 | $O_2$ | 155 | 170 | 190 | 205 | 210 |
| 2 | 360 | 100 | $CO_2$ in Water | 200 | 6.5 | $O_2$ | 350 | 460 | 545 | 620 | 715 |
| 3 | 360 | 100 | $CO_2$ in Water | 200 | 6.0 | $H_2O_2$ (100 ppm free oxygen basis) | 270 | 385 | 460 | 545 | 600 |

From the foregoing it will be seen that in employing the process of the present invention, plugging problems and loss of injectivity normally associated with sodium and ammonium bicarbonate leaching solutions are reduced and the productivity of solution mining processes is maintained. In addition, it has been shown that the leaching solution employed in the present process is highly effective in solubilizing uranium values from ore deposits.

While there have been described the preferred embodiments of the invention, it is clear that many modifications may be made without departing from the spirit and scope of the invention as defined in the appended claims.

I claim:

1. In a method for the solution mining of a substance which in an oxidized state is soluble in an aqueous leaching solution, said method comprising the steps of (1) introducing an oxidant and an aqueous leaching solution into a subterranean deposit containing said substance, thereby to solubilize said substance in situ to form a pregnant liquor, (2) recovering said pregnant liquor from said deposit, and (3) separating said substance from said pregnant liquor, the improvement comprising:

utilizing as said aqueous leaching solution a solution comprising a dilute aqueous carbonic acid solution and said oxidant.

2. The method of claim 1 wherein the concentration of said carbonic acid is sufficient to provide a bicarbonate ion concentration in said leaching solution between about 380 ppm and about 1000 ppm.

3. The method of claim 1 wherein the concentration of said carbonic acid is sufficient to provide a bicarbonate ion concentration in said leaching solution of between about 460 ppm and about 700 ppm.

4. The method of claim 1 further including the step of introducing gaseous carbon dioxide and a water soluble oxidizing agent into water thereby to form said leaching solution.

5. The method of claim 1 wherein said substance is selected from the group consisting of uranium, thorium, vanadium, copper, nickel, molybdenum, rhenium and selenium.

6. The method of claim 1 wherein said substance is uranium.

7. A method for the recovery of uranium values from a subterranean formation comprising the steps of:

introducing a leaching solution comprising a dilute aqueous carbonic acid solution containing an oxidizing agent for said uranium values into said subterranean formation wherein said uranium values are solubilized in said leaching solution to form a pregnant liquor, the concentration of said carbonic acid in said leaching solution being sufficient to provide a bicarbonate ion concentration in said leaching solution between about 380 ppm and about 1000 ppm and said leaching solution having a pH of less than about 7;

thereafter recovering said pregnant liquor from said formation; and separating and recovering said uranium values from said pregnant liquor.

8. The method of claim 7 wherein the concentration of said carbonic acid in said leaching solution is sufficient to provide a bicarbonate ion concentration in said leaching solution between about 460 ppm and about 700 ppm.

9. The method of claim 7 wherein the concentration of said carbonic acid in said leaching solution is sufficient to provide a bicarbonate ion concentration in said pregnant liquor between about 600 ppm and about 690 ppm.

10. The method of claim 7 wherein said oxidizing agent is selected from the group consisting of potassium permanganate, hydrogen peroxide, potassium ferricyanide, sodium hypochlorite, potassium peroxydisulfate, oxygen and oxygen-containing gases.

11. The method of claim 7 wherein said oxidant is hydrogen peroxide.

12. The method of claim 7 wherein the concentration of said oxidizing agent in said leaching solution is between about 50 ppm and about 200 ppm on a free oxygen basis.

13. The method of claim 7 wherein said carbonic acid solution is formed by introducing gaseous carbon dioxide into water thereby to form an aqueous solution of at least a portion of said carbon dioxide.

14. A process for the recovery of uranium values from a subterranean deposit comprising the steps of:

(a) penetrating said deposit with at least one injection well and at least one production well in spaced relation with said injection well;

(b) introducing an aqueous leaching solution comprising carbonic acid and an oxidizing agent selected from the group consisting of hydrogen peroxide, oxygen and oxygen-containing gases from said injection well into said deposit to leach in situ uranium values therefrom thereby forming a pregnant liquor, the concentration of said carbonic acid in said leaching solution being sufficient to provide a bicarbonate ion concentration in said leaching solution between about 380 ppm and about 1000 ppm and the concentration of said oxidizing agent in said leaching solution being between about 50 ppm and about 200 ppm on a free oxygen basis;

(c) recovering said pregnant liquor at said production well;

(d) forming a barren liquor by separating said uranium values from said pregnant liquor;

(e) introducing gaseous carbon dioxide and said oxidizing agent into said barren liquor thereby to form said aqueous leaching solution; and (f) recycling at least a portion of the solution formed in step (e) for reintroduction into said deposit in step (b).

15. The process of claim 14 wherein said carbon dioxide and said oxidizing agent are introduced into said barren liquor prior to reinjecting the solution thus formed into said injection well as said leaching solution.

16. The process of claim 14 wherein said leaching solution has a pH of between about 6 and about 7.

17. The process of claim 14 wherein said leaching solution has a carbonic acid concentration sufficient to provide a bicarbonate ion concentration in said leaching solution of between about 460 ppm and about 700 ppm.

18. The process of claim 14 wherein said carbon dioxide is introduced directly into said injection well and is therein solubilized in an aqueous solution comprising said barren liquor and said oxidizing agent to thereby form said leaching solution in said injection well.

19. The method of claim 1 wherein said oxidant is selected from the group consisting of potassium permanganate, hydrogen peroxide, potassium ferricyanide, sodium hypochlorite, potassium peroxydisulfate, oxygen and oxygen-containing gases.

20. The method of claim 1 wherein the concentration of said oxidant in said leaching solution is between about 50 ppm and about 200 ppm on a free oxygen basis.

21. In the solution mining of substances from a subterranean formation using an alkaline carbonate leaching solution wherein the leaching solution is introduced into an injection well for percolation through the formation and the solution containing dissolved substance is recovered from a production well spaced from said injection well, a method for increasing the injectivity of said injection well comprising injecting an aqueous solution of an oxidizing agent into the injection well and simultaneously introducing gaseous carbon dioxide into the injection well.

22. The method of claim 21 wherein the oxidizing agent is hydrogen peroxide.

23. The method of claim 22 wherein the concentration of said hydrogen peroxide in said aqueous solution is between about 50 ppm and about 200 ppm on a free oxygen basis.

24. The method of claim 21 wherein at least a portion of said gaseous carbon dioxide is solubilized into said aqueous solution to form a dilute carbonic acid solution in said injection well, said portion being sufficient to provide a bicarbonate ion concentration in said aqueous solution between about 380 ppm and about 1000 ppm.

25. The process of claim 14 wherein said oxidizing agent is hydrogen peroxide.

* * * * *